July 9, 1935.  S. KOBZY  2,007,398
BI-POLE INDUCTION MOTOR
Filed July 30, 1934
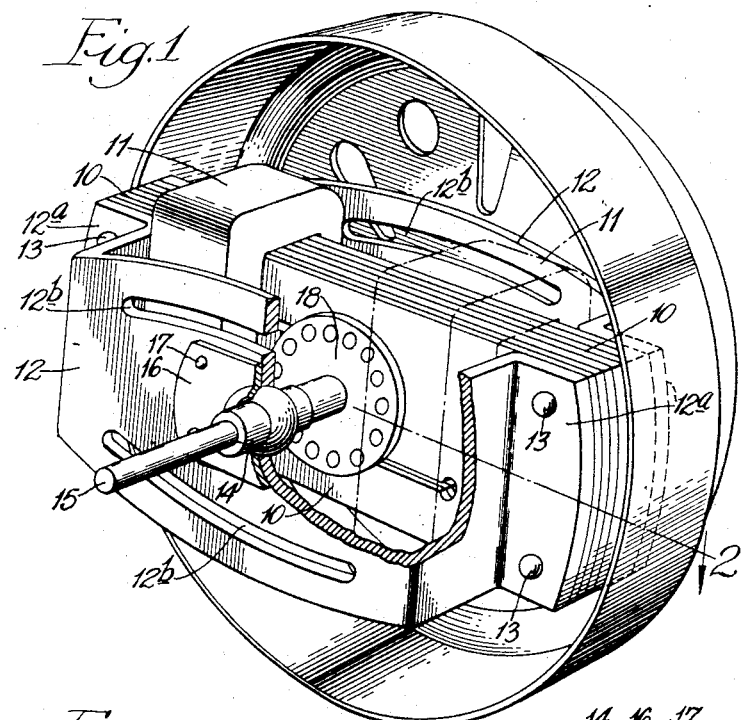
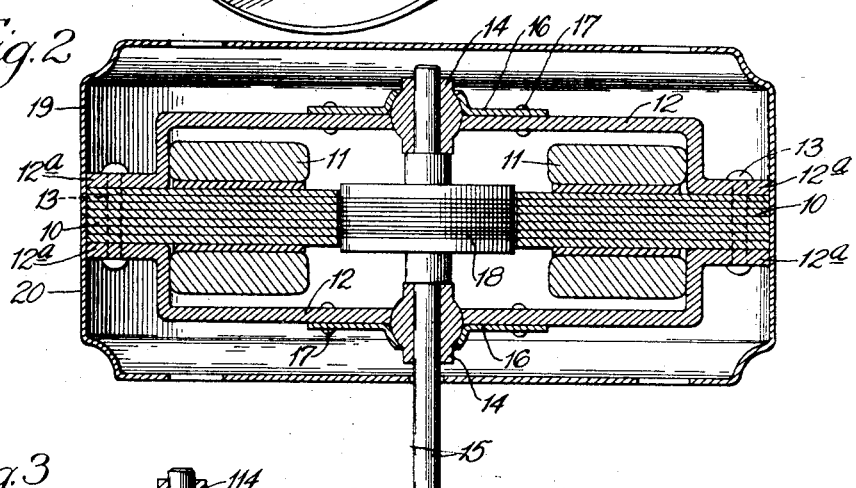
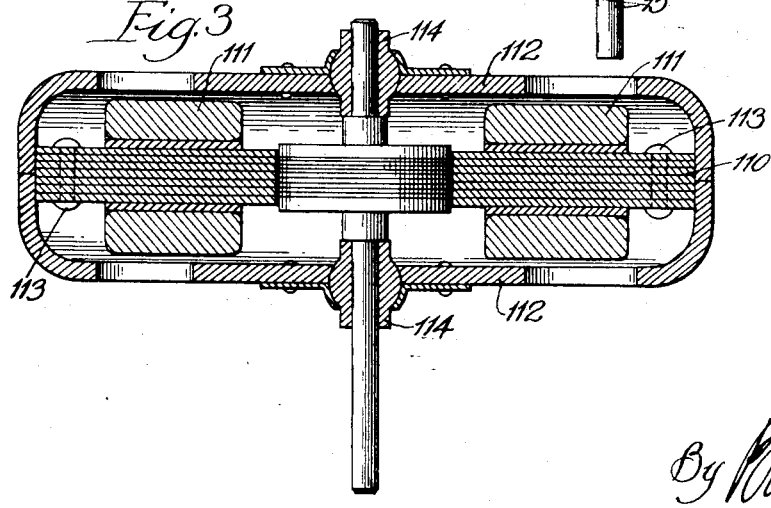
Inventor:
Steven Kobzy,
By Banning & Banning
Attys.

Patented July 9, 1935

2,007,398

UNITED STATES PATENT OFFICE 2,007,398

BI-POLE INDUCTION MOTOR

Steven Kobzy, Chicago, Ill.

Application July 30, 1934, Serial No. 737,490

6 Claims. (Cl. 172—120)

An object of this invention is to provide a simplified and improved form of bi-pole induction motor.

This and other objects, as will hereinafter appear, are accomplished by this invention which is fully described in the following specification and shown in the accompanying drawing, in which—

Figure 1 is a perspective view of one form of the invention showing parts of the motor removed or broken away;

Fig. 2 is a section on the line 2 of Fig. 1; and

Fig. 3 is a section similar to Fig. 2 but showing a modification of the invention.

The embodiment illustrated in Figs. 1 and 2 comprises a stator core 10 made up of laminations carrying the coils 11. Members 12 formed from heavy sheet metal surround the windings 11 and have offset portions 12ª secured to the outer ends of the core 10 by means of rivets 13. The members 12 are of magnetic material and form a return for the magnetic flux from one end of the core to the other. They also serve to support bearings 14 for the rotor shaft 15. The bearings are held in place by these members in any suitable manner, such as by means of bearing plates 16 which are secured to the members by rivets 17. The rotor shaft 15 carries a laminated rotor 18 which is of a well known type, and therefore is not shown in detail.

The member 12 is preferably provided with longitudinal slots 12ᵇ which assist in dissipating heat generated in the member, and these members are preferably made wider at the center, as shown in Fig. 1, to increase the cross sectional area at the point where the member is cut out for the bearing 14.

The motor, as illustrated, is enclosed in a casing composed of two halves 19, 20 which are secured thereon in any desired manner, but preferably by friction. In Fig. 3 is shown a modified form of the device in which the laminations composing the stator core 110 carries field windings 111 as in Fig. 1, and are held together by means of rivets 113. In this case the magnetic sheet metal members 112 are made in the form of circular cups which are tightly pressed over the ends of the core 111 so as to firmly hold them in place thereon. They likewise form the return path for the magnetic flux and also serve to retain the bearings 114.

Thus it will be seen that in both these forms a very simple and efficient method of making and assembling induction motors has been provided.

While I have shown and described but a few embodiments of my invention, it is to be understood that it is capable of many modifications. Changes, therefore, in the construction and arrangement may be made which do not depart from the spirit and scope of the invention as disclosed in the appended claims.

I claim:

1. In a bi-pole induction motor, a laminated stator core having a central perforation for receiving the rotor, field windings on the core, the core extending beyond the windings, a rotor having a rotor shaft, and a magnetic member at each side of the core connecting the ends of the core so as to form a return path for the magnetic flux, the members carrying bearings for the shaft.

2. In a bi-pole induction motor, a laminated stator core having a central perforation for receiving the rotor, field windings on the core, the core extending beyond the windings, a rotor having a rotor shaft, and a magnetic member at each side of the core connecting the ends of the core so as to form a return path for the magnetic flux, the members carrying bearings for the shaft and being of substantially the same width as the core.

3. In a bi-pole induction motor, a laminated stator core having a central perforation for receiving the rotor, field windings on the core, the core extending beyond the windings, a rotor having a rotor shaft, and a magnetic member at each side of the core connecting the ends of the core so as to form a return path for the magnetic flux, the members carrying bearings for the shaft and being of substantially the same width as the core and being riveted thereto at its ends.

4. In a bi-pole induction motor, a laminated stator core having a central perforation for receiving the rotor, field windings on the core, the core extending beyond the windings, a rotor having a rotor shaft, and a magnetic member at each side of the core connecting the ends of the core so as to form a return path for the magnetic flux, the members carrying bearings for the shaft and being of substantially the same cross sectional area throughout.

5. In a bi-pole induction motor, a laminated stator core having a central perforation for receiving the rotor, field windings on the core, the core extending beyond the windings, a rotor having a rotor shaft, and a magnetic member at each side of the core connecting the ends of the core so as to form a return path for the magnetic flux, the members carrying bearings for the shaft and being of substantially the same cross sectional area throughout and having longitudinal slots to assist in dissipating heat therefrom.

6. In a bi-pole induction motor, a laminated stator core having a central perforation for receiving the rotor, field windings on the core, the core extending beyond the windings, a rotor having a rotor shaft, and a cup-shaped magnetic member at each side of the core connecting the ends of the core so as to form a return path for the magnetic flux, the members carrying bearings for the shaft and serving to enclose the stator and rotor.

STEVEN KOBZY.